US011206886B1

(12) United States Patent
Clarke et al.

(10) Patent No.: US 11,206,886 B1
(45) Date of Patent: Dec. 28, 2021

(54) FLUID-REPELLANT, ANTIMICROBIAL FABRICS AND METHODS FOR MAKING SAME

(71) Applicant: Vestagen Protective Technologies, Inc., Orlando, FL (US)

(72) Inventors: Dawn Clarke, Pawleys Island, SC (US); Forrest Putnam, Chesnee, SC (US); Ben Favret, Windermere, FL (US)

(73) Assignee: VXK Products, LLC, Virginia Beach, VA (US)

( * ) Notice: Subject to any disclaimer, the term of this patent is extended or adjusted under 35 U.S.C. 154(b) by 429 days.

(21) Appl. No.: 15/353,090

(22) Filed: Nov. 16, 2016

(51) Int. Cl.
| | |
|---|---|
| *A41D 31/102* | (2019.01) |
| *A41D 31/30* | (2019.01) |
| *A01N 25/08* | (2006.01) |
| *A41D 13/12* | (2006.01) |
| *A41D 13/00* | (2006.01) |
| *A41D 31/12* | (2019.01) |

(52) U.S. Cl.
CPC ............ *A41D 31/30* (2019.02); *A01N 25/08* (2013.01); *A41D 13/0015* (2013.01); *A41D 13/12* (2013.01); *A41D 13/1236* (2013.01); *A41D 31/102* (2019.02); *A41D 31/12* (2019.02); *A41D 2600/20* (2013.01)

(58) Field of Classification Search
None
See application file for complete search history.

(56) References Cited

U.S. PATENT DOCUMENTS

| | | | | |
|---|---|---|---|---|
| 4,016,831 A | * | 4/1977 | James | D06N 7/0086 118/415 |
| 4,562,097 A | * | 12/1985 | Walter | D06B 19/0094 427/209 |
| 4,761,326 A | * | 8/1988 | Barnes | A61L 2/26 428/219 |
| 5,034,266 A | * | 7/1991 | Kinlaw | A47G 9/00 442/226 |
| 5,134,017 A | * | 7/1992 | Baldwin | A62D 5/00 2/1 |
| 6,759,127 B1 | * | 7/2004 | Smith, III | D03D 15/12 428/370 |
| 7,842,625 B1 | * | 11/2010 | Stockton | D06M 13/02 442/164 |
| 8,822,354 B2 | * | 9/2014 | White | B32B 27/12 442/123 |
| 2002/0064639 A1 | * | 5/2002 | Rearick | A61F 13/51305 428/292.1 |
| 2004/0102113 A1 | * | 5/2004 | DeMott | B32B 27/12 442/64 |
| 2005/0062010 A1 | * | 3/2005 | Fang | D06M 11/42 252/8.62 |

(Continued)

*Primary Examiner* — Cachet I Proctor
(74) *Attorney, Agent, or Firm* — Thomas | Horstemeyer, LLP

(57) ABSTRACT

In one embodiment, a fabric is treated by creating a treatment solution comprising a fluid repellant and an antimicrobial compound, creating a treatment foam from the treatment solution, and applying the treatment foam to only an outer side of a fabric so as to coat the outer side of the fabric with the fluid repellant and the antimicrobial compound without coating an inner side of the fabric with the fluid repellant and the antimicrobial compound.

20 Claims, 3 Drawing Sheets

(56) References Cited

U.S. PATENT DOCUMENTS

| | | | |
|---|---|---|---|
| 2005/0181691 A1* | 8/2005 | Klutz | D06M 23/04 |
| | | | 442/59 |
| 2005/0215145 A1* | 9/2005 | Guerrero | A41D 31/02 |
| | | | 442/59 |
| 2005/0272334 A1* | 12/2005 | Wang | D06M 11/44 |
| | | | 442/93 |
| 2006/0292951 A1* | 12/2006 | Dutkiewicz | A61F 13/53747 |
| | | | 442/79 |
| 2010/0009583 A1* | 1/2010 | Bringley | D06M 13/282 |
| | | | 442/80 |

* cited by examiner

FLUID-REPELLANT, ANTIMICROBIAL FABRICS AND METHODS FOR MAKING SAME

BACKGROUND

Healthcare workers have historically worn "scrubs" and lab coats made of fabrics that have little to no protective properties. The fabrics used in these garments are normally simply dyed fabrics that may or may not be finished with a softening agent. As such, healthcare worker garments do not provide protection against fluid exposure and do not provide antimicrobial protection. This is unfortunate as such workers are often exposed to fluids and microbes on the job that may be harmful to the worker's and patient's health.

Although healthcare worker garments have been introduced in recent years that provide fluid repellency and antimicrobial protection, these garments are uncomfortable to wear as the treatments performed on the fabrics used to manufacture the garments result in the fabrics being equally fluid repellent on the inner side of the fabric, which faces the wearer, as they are on the outer side of the fabric. The fluid repellency (hydrophobicity) of the inner side of the fabric inhibits the ability of the fabric to wick moisture away from the wearer's skin and, therefore, significantly decreases wearer comfort. This is unfortunate as the fluid repellency is only needed on the outer side of the fabric.

In view of the above discussion, it can be appreciated that it would be desirable to have fluid-repellant, antimicrobial fabrics that can be used to make garments that provide healthcare protection but are comfortable to wear.

BRIEF DESCRIPTION OF THE DRAWINGS

The present disclosure may be better understood with reference to the following figures. Matching reference numerals designate corresponding parts throughout the figures, which are not necessarily drawn to scale.

DETAILED DESCRIPTION

Figure 1A:
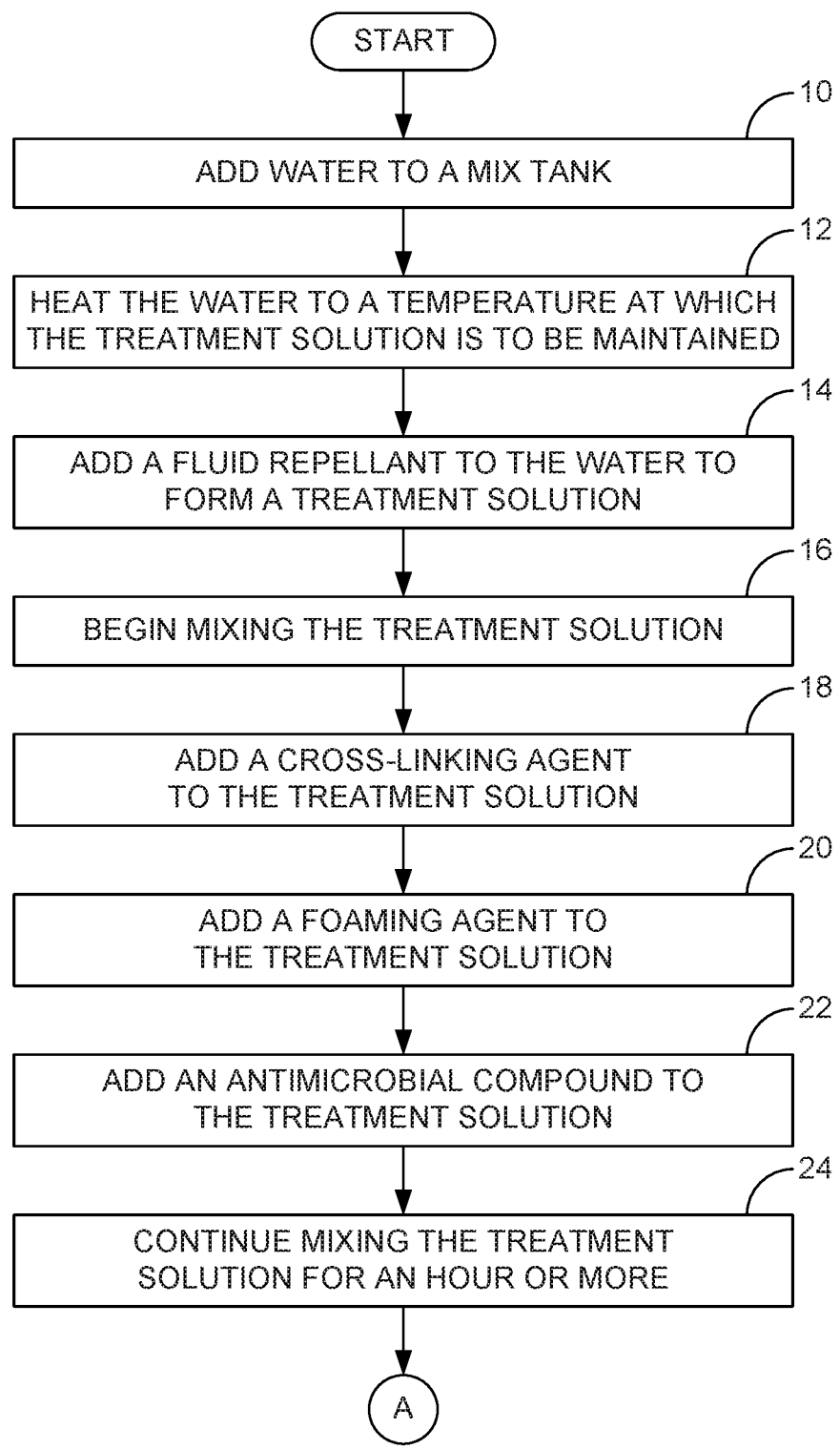
FIGS. 1A and 1B together comprise is a flow diagram of an embodiment of a method for treating fabric to render the fabric fluid repellant and antimicrobial.

As described above, it would be desirable to have fluid-repellant, antimicrobial fabrics that can be used to make garments that provide healthcare protection but are comfortable to wear. Examples of such fabrics and methods used to produce them are described herein. In some embodiments, the fabrics are treated on an outer side (face) of the fabric but are not treated on the inner side (back) of the fabric, which faces the wearer when the garment is worn. In some embodiments, the fabric is treated using a foam finishing process in which a foam comprising a fluid repellant and an antimicrobial compound is applied to the outer side of the fabric. Because the foam comprises a relatively small volume of treatment solution (and therefore fluid repellant) and is only applied to the outer side of the fabric, very little fluid repellent reaches the inner side of the fabric. As a consequence, the inner side of the fabric remains hydrophilic and can wick away moisture, such as sweat, from the wearer's body, greatly increasing wearer comfort. The result then is a fabric that is capable of repelling potentially harmful fluids but that is also comfortable to wear.

In the following disclosure, various specific embodiments are described. It is to be understood that those embodiments are example implementations of the disclosed inventions and that alternative embodiments are possible. All such embodiments are intended to fall within the scope of this disclosure.

Disclosed herein are fluid-repellant, antimicrobial fabrics suitable for use in manufacturing healthcare worker garments, such as scrubs or lab coats and patient apparel. While the healthcare worker and patient apparel (i.e., medical) application has been explicitly identified, it is to be understood that the fabrics disclosed herein could be used to manufacture other garments, such as garments worn by the police or firefighters, as well as athletic garments. As identified above, the fabrics used to create the garments are treated using a foam finishing process in which a foam containing a fluid repellant and an antimicrobial compound is applied only to the outer side of the fabric so that the bulk of the fluid repellant and an antimicrobial compound resides on the outer side of the fabric. Although small amounts of fluid repellant and/or antimicrobial compound may penetrate the fabric and reach the inner side of the fabric, the amount of these compounds is small and, therefore, has a negligible effect on the hydrophilicity of the inner side of the fabric.

As fluid repellency and antimicrobial performance is only needed on the outer side of the garments, the disclosed garments provide a high level of protection to the wearer without sacrificing comfort. In the healthcare worker context, the fabric provides protection to workers in circumstances in which intermittent or unexpected exposure to microorganisms from blood, body fluids, and other potentially infectious material (OPIM) can occur. Significantly, the fluid repellant and antimicrobial treatments are highly durable to laundering. This result is achieved through careful selection of the chemical compounds used in the treatment as well as the settings selected for the treatment equipment that ensure sufficient cross-linking that enables the fabric to retain its hydrophobic and antimicrobial properties through multiple laundering cycles.

FIG. 1 is a flow diagram of an example method for treating a fabric to provide fluid repellency and antimicrobial properties on the outer side (face) of the fabric. The first task in the process is to prepare a treatment solution (chemical bath) that can be used to create a treatment foam that will be applied to one side of a fabric. In some embodiments, the solution is an aqueous solution that comprises all of the compounds with which the fabric is to be treated. In preparing the solution, an amount of water suitable for treating a given amount of fabric is first added to a mix tank, as indicated in block 10 of FIG. 1A. FIG. 2, which is a block diagram of a treatment apparatus that can be used in the treatment process, identifies such a mix tank 40.

Once the water has been added to the tank, the water can be heated or cooled to a temperature at which the treatment solution will be maintained throughout its preparation, as indicated in block 12. In some embodiments, the treatment solution is maintained at a temperature of approximately 70° F. to 100° F.

Next, a fluid repellant can be added to the water to form a treatment solution, as indicated in block 14 of FIG. 1A. The fluid repellant comprises a compound that will render the outer side of the fabric hydrophobic. In some embodiments, the fluid repellant is selected from the group consisting of fluoroacrylate acrylate co-polymer, fluorochemical urethane, fluoro methacrylate co-polymer, fluorocarbon resin, fluorinated acrylic co-polymer, perfluoroalkyl acrylic co-polymerisate, a melamine wax emulsion, paraffin wax, hydrocarbon wax, fluorocarbon resin polymers of highly branched dendrimers in a matrix of hydrocarbon, and mixtures thereof. In some embodiments, the selected fluid repellant comprises approximately 10% to 80% of the completed treatment solution by weight.

Once the fluid repellant has been added to the water, mixing of the treatment solution can begin, as indicated in block 16. After approximately 5 minutes of mixing, a cross-linking agent can be added to the solution, as indicated in block 18. The cross-linking agent is the compound that causes the polymer chains of the fluid repellant and the antimicrobial compound to bond together to increase the durability of the fluid repellant and antimicrobial compound. In some embodiments, the cross-linking agent is selected from the group consisting of a blocked pre-polymer based on isocyanates, an aqueous dispersion of polyurethane, a dispersion of an oxime-blocked polyisocyanate, and mixtures thereof. In some embodiments, the selected cross-linking agent comprises approximately 0.1% to 20% of the completed treatment solution by weight.

Mixing of the treatment solution continues during and after the addition of the cross-linking agent. After approximately 5 minutes of mixing after the cross-linking agent has been added, a foaming agent can next be added to the treatment solution, as indicated in block 20. The foaming agent is a non-ionic or cationic compound that enables foaming of the solution for purposes of applying the solution to the fabric as a foam. In some embodiments, the foaming agent is selected from the group consisting of POE (6) isodecyl alcohol, POE (4) isodecyl alcohol, alkyl dimethyl amine, dodecanamide, N-[3-(dimethylamino) propyl]-N-oxide, and mixtures thereof. In some embodiments, the selected foaming agent comprises approximately 0.5% to 20% of the completed treatment solution by weight.

Mixing of the treatment solution further continues during and after the addition of the foaming agent. After approximately 5 minutes of mixing after the foaming agent has been added, an antimicrobial compound can be added to the treatment solution, as indicated in block 22. The antimicrobial compound provides the antimicrobial properties of the outer side of the fabric. In some embodiments, the antimicrobial compound is selected from the group consisting of organosilane quatamony compounds based on quat silane, silane quaternary amine, silver, and silver ion-based compounds and dispersions, polyhexamethylene biguanide (PHMB), zinc pyrithione (ZPT), and mixtures thereof. In some embodiments, the selected antimicrobial compound comprises approximately 1% to 15% of the completed treatment solution by weight percentage. In some embodiments, the antimicrobial compound can be heated to a temperature of approximately 77° F. to 122° F. prior to it being adding to the solution.

After the antimicrobial compound has been added, the treatment solution is complete and can be mixed for a further hour or more before it will be used on a fabric, as indicated in block 24. Notably, other compounds can be added to the solution as desired to enhance the durability of the fluid repellency and/or antimicrobial performance. For example, a polyurethane or melamine wax emulsion can be added to the solution for this purpose. Once the mixing is completed, the solution is ready for use. In some embodiments, the solution has a pH of approximately 3 to 7.

Figure 1B:
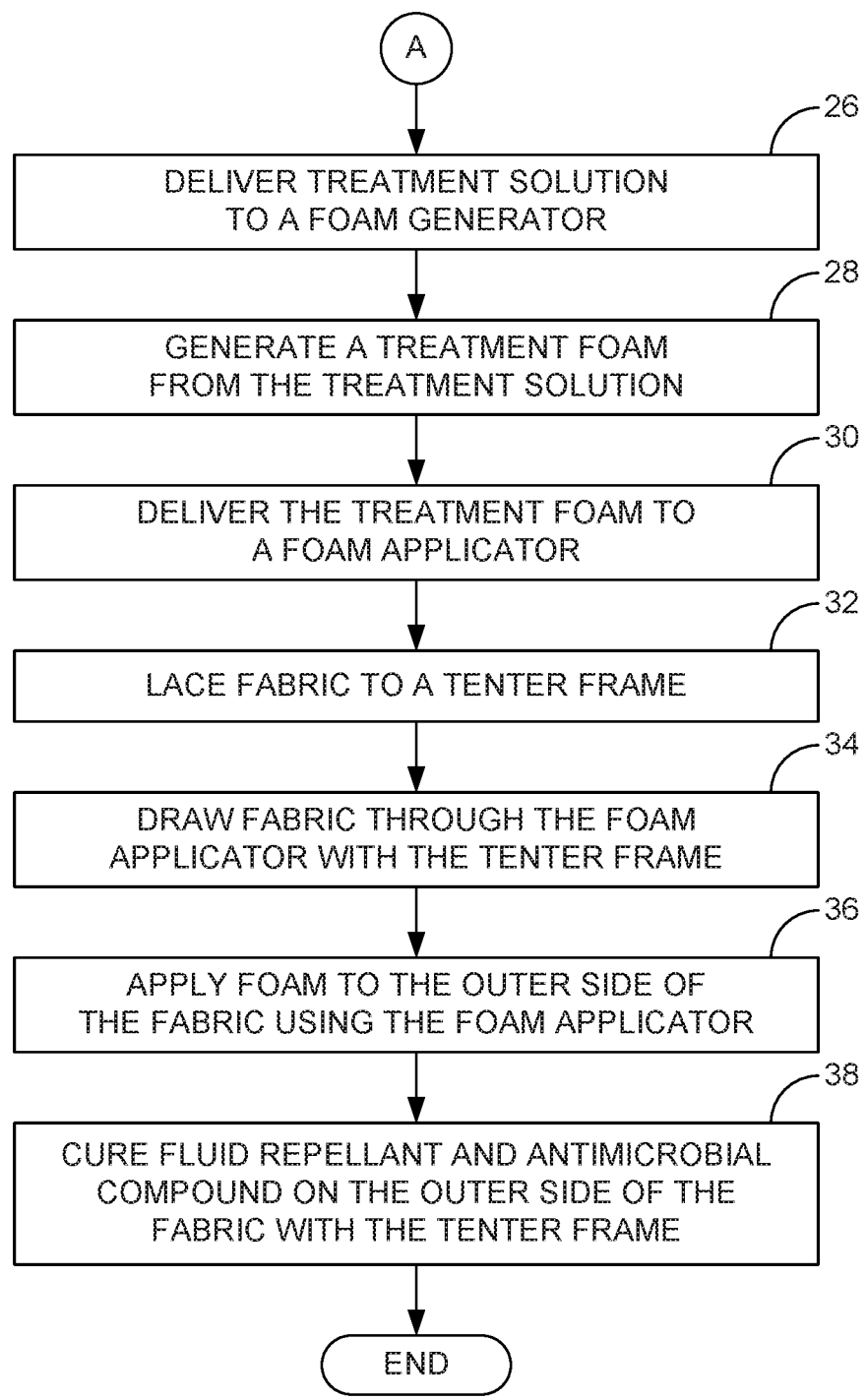
Figure 2:
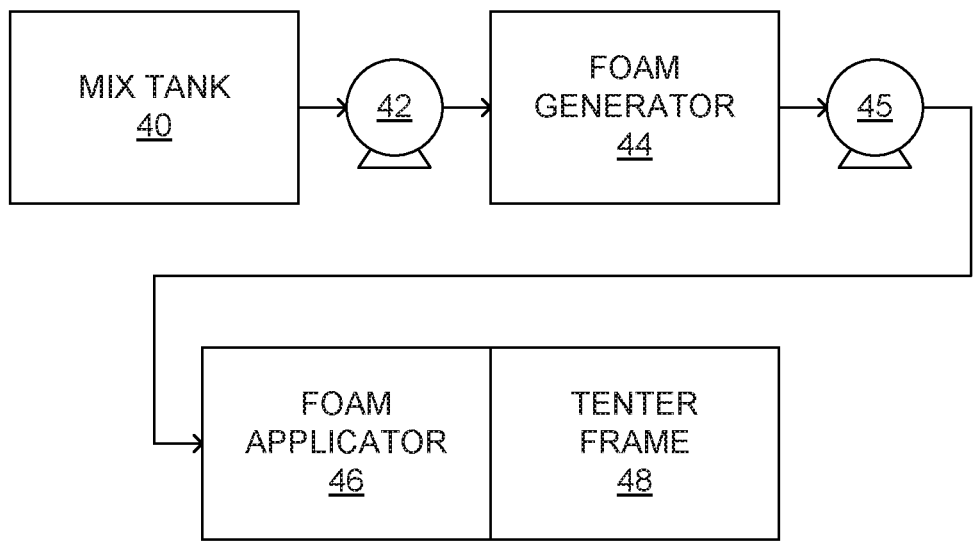
FIG. 2 is a block diagram of an embodiment of treatment apparatus that can be used in the method of FIG. 1.

With reference next to block 26 of FIG. 1B, the prepared treatment solution can be delivered to a foam generator so that the solution can be used to generate a treatment foam (block 28) suitable for use in a foam finishing process. As shown in FIG. 2, the treatment solution can be pumped to a foam generator 44 using a pump 42. During operation of the foam generator 44, a rich foam is enabled to develop that has a consistency of shaving cream. This typically takes approximately 4 to 10 minutes. Once the foam has the proper consistency, the foam can be delivered to a foam applicator for use in applying the foam to a fabric, as indicated in block 30. As shown in FIG. 2, the foam can be pumped to the foam applicator 46 using a pump 45. In some embodiments, the foam applicator 46 is mounted to a tenter frame (48, FIG. 2) that will be used to cure the foam on the outer surface of the fabric. The foam applicator 46 can be a top, bottom, or side unit.

Prior to applying the foam to the fabric, the fabric is laced at the entrance of the tenter frame (block 32) and the width and weight of the fabric is recorded and used to calculate the desired chemical add-on. The wet add-on can be approximately 5% to 50% depending upon the desired fabric performance. The fabric to which the foam is applied can be selected based upon the desired properties. Such fabrics can comprise natural fibers, synthetic fibers, or both. By way of example, the fabric can comprise one or more of polyester, nylon, cellulosic (e.g., cotton or rayon), bamboo, olefin, stretch (e.g., spandex), treated flame resistant (e.g., flame resistant polyester), and inherently flame resistant (e.g., meta-aramid) fibers.

In some embodiments, the fabric comprises only one material. For example, the fabric can be 100% polyester, 100% nylon, 100% cotton, 100% rayon, 100% flame resistant polyester, or 100% meta-aramid. In other embodiments, the fabric is a blended fabric comprising two or more materials. One such fabric blend is a polyester blend. In some embodiments, a polyester blend comprises 15-95% polyester, 15-95% cellulosic, and up to 30% stretch fiber by fabric weight. In other embodiments, a polyester blend comprises 40-85% polyester, 15-65% cellulosic, and up to 15% stretch fiber by fabric weight. One example of such a fabric blend is currently produced under the name Vestagen Signature Stretch Series™, which comprises 79% polyester, 18% rayon, and 3% spandex by fabric weight. In other embodiments, the fabric blend can be a nylon blend that is 15-95% nylon, 15-95% cellulosic, and up to 30% stretch fiber by fabric weight. In still other embodiments, the fabric blend can be a flame resistant (FR) blend that comprises 15-95% flame resistant polyester and 15-95% meta-aramid.

Irrespective of the materials used to form the fabric, the fibers of the fabric can be spun or filament fibers and can be combined to form yarns, which can be textured or untextured. The fabrics can be woven or knitted and can have a fabric weight of approximately 3.0 oz/sqyd to 9.0 oz/sqyd. As an example, the aforementioned Vestagen Signature Stretch Series™ fabric is left-hand twill weave having a weight of approximately 4.3 oz/sqyd after all finishing and treating. The fabrics can also be dyed. In some embodiments, such dyeing is performed prior to the foam treatment using a dyebath having a pH of approximately 4 to 8. To ensure proper adhesion of the components in the treatment foam to the outer side of the fabric, the fabric should contain no residual chemicals, such as silicone, softeners, surfactants, size, or lubricants.

The fabric can be laced on the tenter frame in a manner in which the foam can be directly applied to the outer side of the fabric with the applicator. The tenter frame is then started and the fabric is drawn through the foam applicator by the tenter frame (block 34) to enable the applicator to apply foam to the outer side of the fabric (block 36). The foam applicator settings can be selected to precisely control the amount of foam applied to the fabric and limit the amount of foam that could reach the inner side of the fabric. By way of example, the foam applicator can comprise a Gaston Systems CFS, which encompasses both the foam generator and the foam applicator, that is set to have a main liquid flow rate of approximately 0.5 to 5.0 l/min, an air blow ratio (i.e., the ratio of the liters of air to the liters of liquid) of approximately 4.0 to 20.0, a mixer speed percentage of approximately 20 to 100 (i.e., percentage of maximum motor speed), and a bottom applicator pressure of approximately 5 to 50 in. of water column. During the foam application, in-line checks, in which plain water is sprayed onto both sides of the fabric, can be used to confirm the difference in fluid repellency of the face of the fabric as compared to the back of the fabric.

In some embodiments, the tenter frame is operated at a temperature of approximately 250° F. to 420° F. and at a speed that results in a dwell time of approximately 20 seconds to 2 minutes and 40 seconds for single pass. During this pass, the fluid repellant and the antimicrobial compound are cured on the outer side of the fabric with the tenter frame, as indicated in block 38. If additional curing is needed, a second pass can be performed in which the fabric is subjected to dry heat for up to an additional 3 minutes of dwell time. A secondary pass on the tenter frame can be performed at a different temperature than the initial pass, if desired.

Figure 3:
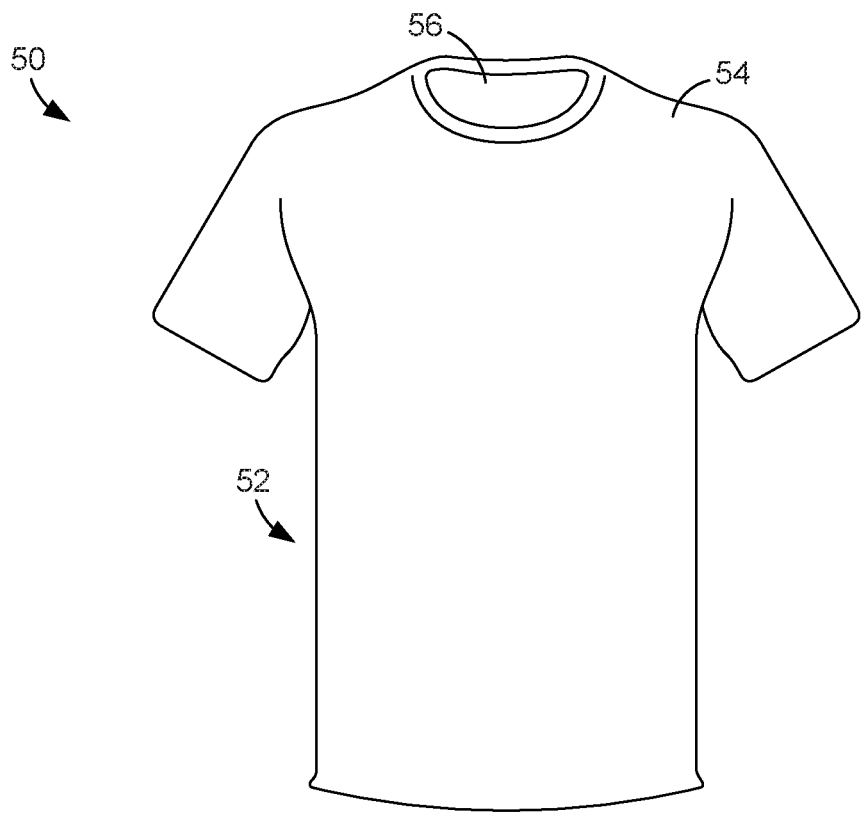
FIG. 3 is a schematic view of a garment made from fabric treated using the method of FIG. 1.

The fabric that results from the above-described process is very breathable and has a soft, supple hand due to the low amount of treatment solution applied during the foam finishing process. Because the water repellant is primarily applied to the outer side of the fabric, the outer side is hydrophobic while the inner side of the fabric is hydrophilic such that it readily wicks moisture, such as sweat. This greatly improves the comfort of the fabric as compared to other commercially available liquid repellant fabrics. The fabric can be used to manufacture various garments, such as those used in the medical, law enforcement, and firefighting fields, as well as athletics. FIG. 3 shows an example garment 50 made from a foam-treated fabric substrate 52. The outer side (face) 54 of the fabric 52, which comprises the bulk of the cured fluid repellant and antimicrobial compound, faces outward from the wearer, while the inner side (back) 56 of the fabric, which comprises only minimal amounts of cured fluid repellant and antimicrobial compound, faces toward the wearer.

Industry-recognized textile test methods were used to assess the hydrophobicity of the outer and inner sides of a foam-treated fabric prepared using the above-described process, both initially and after laundering. These tests included the AATCC 22-2014 water repellency spray test, the AATCC 118-2013 oil repellency hydrocarbon resistance test, and the AATCC 193-2012 aqueous liquid repellency water/alcohol solution resistance test. Each of these tests were performed on the Vestagen Signature Stretch Series™ fabric described above. When laundering was performed for a test, this laundering was performed in accordance with AATCC Test Method 135: Dimensional Changes of Fabrics after Home Laundering (2015), Table 1, and AATCC Monograph 6-2016: Standardization of Home Laundry Test Conditions, with a load size 1.8 kg. The washing machine used in the testing was a top loading machine and was set to "normal" wash on the "hot" temperature setting. The fabrics were washed with 80 g of Original Scent Liquid Tide® and tumble-dried under "normal medium" conditions. The climate-controlled conditions of the laboratory during the laundering were 21° C. (±2° C.) and 65% relative humidity (+/−5% RH). The results of these tests are provided below:

AATCC 22-2014 Water Repellency: Spray Test

The unlaundered outer surface (face) of the fabric and the unlaundered inner side (back) of the fabric were spray tested in accordance with the AATCC 22-2014 Water Repellency: Spray Test. The unlaundered outer surface (face) of the fabric exhibited a minimum spray rating of a 95 and the unlaundered inner side (back) of the fabric exhibited a maximum spray rating of 50.

Each production lot was also tested in accordance with AATCC 22-2014 after 50 home launderings using the protocol identified in AATCC Monograph M6. After 50 wash/dry laundering cycles, the face of the fabric had a minimum spray rating of a 70 and the back of the fabric had a maximum spray rating of 50.

AATCC 118-2013 Oil Repellency: Hydrocarbon Resistance Test

The outer surface (face) of the fabric was tested in accordance with the AATCC 118-2013 Oil Repellency: Hydrocarbon Resistance Test. Before laundering, the face of the fabric had a minimum resistance rating of 6. After 50 wash/dry laundering cycles, the face of the fabric had a minimum resistance rating of 2.

AATCC 193-2012 Aqueous Liquid Repellency: Water/Alcohol Solution Resistance Test The outer surface (face) of the fabric was tested in accordance with the AATCC 193-2012 Aqueous Liquid Repellency: Water/Alcohol Solution Resistance Test. Before laundering, the face of the fabric had a minimum resistance rating of 8. After 50 wash/dry laundering cycles, the face of the fabric had a minimum resistance rating of 7.

In addition to testing the fluid repellency of the Vestagen Signature Stretch Series™ fabric, tests were performed to evaluate the breathability of the fabric. All laundering was performed using the protocol described above. The results of the breathability tests are provided below:

ASTM D-737-04 (reapproved in 2016): Standard Test Method for Air Permeability of Textile Fabrics The fabric was tested in accordance with the ASTM D-737-04, to evaluate the breathability of the fabric. Before laundering, the fabric had an air permeability of no less than 120 CFM. After 50 wash/dry laundering cycles, the fabric had had an air permeability of no less than 170 CFM.

ASTM E-96, 2016: Standard Test Method for Water Vapor Transmission of Materials.

The fabric was also tested in accordance with the ASTM E-96, 2016, to evaluate the breathability of the fabric. Before laundering, the fabric had water vapor transmission of no less than 1500 g/m 2/24 hr. After 50 wash/dry laundering cycles, the fabric had had an air permeability of no less than 1500 g/m 2/24 hr.

The antimicrobial performance of the foam-treated fabric was also tested. In particular, a splatter challenge assay was performed to determine the antimicrobial efficacy of the fabric on methicillin-resistant *Staphylococcus aureus* (MRSA), a typical healthcare-related pathogen. Antimicrobial efficacy was tested at 0, 15, 30, and 60 minutes.

For each experiment, overnight cultures of MRSA were prepared by inoculating a bacterial colony from an agar plate into 20 ml tryptic soy broth in a 50 ml tube. Cultures were then incubated overnight on an orbital shaker at 37° C. Cultures were then suspended at a dilution of 1:10 in broth to measure optical density via spectrophotometry at 600 nm and adjusted to achieve an adequate viable concentration in the inoculum solution. For each time point, three sample swatches were prepared for each of the fabrics. Experiments were performed in duplicate.

The target concentration of the inoculum solution was at least 1×108 CFU/ml. Each 14 cm×14 cm swatch was attached to a plastic clipboard in a stand to achieve a slight incline, at an angle of 25° from vertical. One milliliter of the inoculum solution of MRSA was gently pipetted across the top of each sample swatch. The surface of each swatch was then gently wiped with a clean towellette. The samples were then incubated at room temperature (20° C.) for 0, 15, 30, and 60 minutes. At the end of the exposure time, each sample was transferred into a reinforced-neck shaker flask containing 50 ml of recovery buffer. The shaker flasks were shaken on a Burrell Wrist Action Shaker at 400 RPM for 3 minutes at room temperature. Dilutions were then made for each sample, and some of these were plated onto agar plates (estimated to yield between 25 and 250 colonies). The plates were then incubated at 37° C. for 24 hours and colonies were counted. The CFU/ml values were calculated for each data point to determine bacterial concentration in the Recovery Buffer solution.

Test data provided by ResInnova Laboratories using the splatter challenge assay antimicrobial efficacy on the provided untreated control (UTC), dye control (DC), and above-mentioned Vestagen Signature Stretch Series™ fabric demonstrated that the Vestagen Signature Stretch Series™ fabric reduced methicillin-resistant *Staphylococcus aureus* (MRSA), *A baumannii, E faecalis*, and *Klebsiella pneumoniae* Carbapenemase (KPC) by a minimum of 2 logs after 50 washes.

The invention claimed is:

1. A method for treating a fabric, the method comprising:
creating an aqueous treatment solution comprising a fluid repellant, an antimicrobial compound, and a cross-linking agent that bonds the fluid repellant and antimicrobial compound thereby increasing durability of the fluid repellant and antimicrobial compound as fabric treatments;
creating a treatment foam from the aqueous treatment solution;
applying the treatment foam to only an outer side of an untreated fabric so as to coat the outer side of the fabric with the fluid repellant and the antimicrobial compound without coating an inner side of the fabric with the fluid repellant and the antimicrobial compound, where a foam applicator applies the treatment foam to the outer side of the untreated fabric under a controlled pressure prior to curing to limit penetration of the treatment foam through the fabric and maintain breathability through the fabric; and
leaving the inner side of the fabric untreated so as to retain natural characteristics of the fabric enabling wicking of moisture through the fabric, wherein breathability of the fabric after treatment provides an air permeability of at least 120 CFM in accordance with ASTM D-737-04, reapproved 2016.

2. The method of claim 1, wherein creating the aqueous treatment solution comprises creating a treatment solution comprising a fluid repellant selected from the group consisting of fluoroacrylate acrylate co-polymer, fluorochemical urethane, fluoro methacrylate co-polymer, fluorocarbon resin, fluorinated acrylic co-polymer, perfluoroalkyl acrylic co-polymerisate, melamine wax emulsion, paraffin wax, hydrocarbon wax, fluorocarbon resin polymers of highly branched dendrimers in a matrix of hydrocarbon, and mixtures thereof.

3. The method of claim 1, wherein creating the aqueous treatment solution comprises creating a treatment solution comprising an antimicrobial compound selected from the group consisting of organosilane quatamony compounds based on quat silane, silane quaternary amine, silver, and silver ion-based compounds and dispersions, polyhexamethylene biguanide (PHMB), zinc pyrithione (ZPT), and mixtures thereof.

4. The method of claim 1, wherein the cross-linking agent is selected from the group consisting of a blocked prepolymer based on isocyanates, an aqueous dispersion of polyurethane, a dispersion of an oxime-blocked polyisocyanate, and mixtures thereof.

5. The method of claim 1, wherein creating the aqueous treatment solution comprises adding a foaming agent to the treatment solution.

6. The method of claim 5, wherein the foaming agent is selected from the group consisting of POE (6) isodecyl alcohol, POE (4) isodecyl alcohol, alkyl dimethyl amine, dodecanamide, N-[3-(dimethylamino) propyl]-N-oxide, and mixtures thereof.

7. The method of claim 1, further comprising maintaining the treatment solution at a temperature of approximately 70° F. to 100° F.

8. The method of claim 1, wherein creating the treatment foam comprises creating the treatment foam using a foam generator.

9. The method of claim 8, wherein the treatment foam is applied to the outer side of the untreated fabric from the foam generator at a liquid flow rate in a range from about 0.5 liters per minute to about 5.0 liters per minute and an air blow rate in a range from about 4 liters of air to the liters of liquid to about 20 liters of air to the liters of liquid.

10. The method of claim 1, wherein the treatment foam is applied to the outer side of the untreated fabric in a range from about 5% to about 50% of fabric weight.

11. The method of claim 1, wherein the controlled pressure is in a range from about 5 inches of water column to about 50 inches of water column.

12. A method for treating a fabric, the method comprising:
creating an aqueous treatment solution comprising a fluid repellant, an antimicrobial compound, and a cross-linking agent that bonds the fluid repellant and antimicrobial compound thereby increasing durability of the fluid repellant and antimicrobial compound as fabric treatments;
creating a treatment foam from the aqueous treatment solution;
applying the treatment foam to only an outer side of an untreated fabric so as to coat the outer side of the fabric with the fluid repellant and the antimicrobial compound without coating an inner side of the fabric with the fluid repellant and the antimicrobial compound, where a foam applicator applies the treatment foam to the outer side of the untreated fabric under a controlled pressure prior to curing to limit penetration of the treatment foam through the fabric and maintain breathability through the fabric; and
leaving the inner side of the fabric untreated so as to retain natural characteristics of the fabric enabling wicking of moisture through the fabric, wherein breathability of the fabric after treatment provides a water vapor transmission of at least 1500 g/m$^2$/24 hr in accordance with ASTM E-96, 2016.

13. The method of claim 12, wherein the foam applicator is mounted to a tenter frame configured to draw the fabric past the foam applicator.

14. The method of claim 13, further comprising curing the fluid repellant and the antimicrobial compound on the outer side of the fabric using the tenter frame.

15. The method of claim 14, wherein the fluid repellant and the antimicrobial compound are cured at a temperature in a range from about 250° F. to about 420° F.

16. The method of claim 15, wherein the fluid repellant and the antimicrobial compound are cured during a dwell time in a range from about 20 seconds to about 2 minutes and 40 seconds for a single pass.

17. The method of claim 12, wherein creating the aqueous treatment solution comprises:
   adding the cross-linking agent during mixing of a mixture of the fluid repellant and water;
   after a first defined mixing period, adding a foaming agent during mixing of the mixture of the fluid repellant, cross-linking agent and water;
   after a second defined mixing period, adding the antimicrobial compound to the mixture of the fluid repellant, cross-linking agent, foaming agent and water; and
   mixing the mixture of the fluid repellant, cross-linking agent, foaming agent, antimicrobial compound and water for a third defined mixing period before creating the treatment foam.

18. The method of claim 12, wherein the controlled pressure is in a range from about 5 inches of water column to about 50 inches of water column.

19. The method of claim 12, wherein creating the aqueous treatment solution comprises creating a treatment solution comprising an antimicrobial compound selected from the group consisting of organosilane quatamony compounds based on quat silane, silane quaternary amine, silver, and silver ion-based compounds and dispersions, polyhexamethylene biguanide (PHMB), zinc pyrithione (ZPT), and mixtures thereof.

20. The method of claim 12, wherein the cross-linking agent is selected from the group consisting of a blocked pre-polymer based on isocyanates, an aqueous dispersion of polyurethane, a dispersion of an oxime-blocked polyisocyanate, and mixtures thereof.

\* \* \* \* \*